United States Patent
Knepper et al.

(10) Patent No.: US 10,031,555 B2
(45) Date of Patent: *Jul. 24, 2018

(54) PROTECTION LAYER ON A FLEXIBLE SUBSTRATE

(71) Applicant: Dell Products, LP, Round Rock, TX (US)

(72) Inventors: Lawrence E. Knepper, Leander, TX (US); Deeder M. Aurongzeb, Austin, TX (US); John Trevor Morrison, Round Rock, TX (US); Patrick Hampton, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/206,155

(22) Filed: Jul. 8, 2016

(65) Prior Publication Data

US 2016/0320805 A1 Nov. 3, 2016

Related U.S. Application Data

(63) Continuation of application No. 14/615,130, filed on Feb. 5, 2015, now Pat. No. 9,411,378.

(51) Int. Cl.
*G06F 1/16* (2006.01)
*C03C 17/22* (2006.01)
*G06F 3/044* (2006.01)
*G06F 3/041* (2006.01)

(52) U.S. Cl.
CPC ............ *G06F 1/1652* (2013.01); *C03C 17/22* (2013.01); *G06F 1/1616* (2013.01); *G06F 1/1643* (2013.01); *G06F 3/044* (2013.01); *G06F 3/0414* (2013.01); *G06F 3/041* (2013.01); *G06F 2203/04102* (2013.01); *G06F 2203/04103* (2013.01)

(58) Field of Classification Search
CPC ....... G06F 3/041; G06F 3/0412; G06F 1/1652
See application file for complete search history.

(56) References Cited

U.S. PATENT DOCUMENTS

| | | | | |
|---|---|---|---|---|
| 5,194,973 A * | 3/1993 | Isogai | ................... | G02F 1/1334 349/10 |
| 5,508,831 A * | 4/1996 | Nakamura | .......... | G02F 1/13475 349/106 |
| 2012/0008212 A1* | 1/2012 | Wang | .................. | G02B 5/0231 359/599 |
| 2015/0062525 A1* | 3/2015 | Hirakata | ........... | G02F 1/133305 349/158 |
| 2015/0382446 A1* | 12/2015 | Kwon | .................... | H05K 1/028 174/251 |

* cited by examiner

*Primary Examiner* — Anthony Q Edwards
(74) *Attorney, Agent, or Firm* — Prol Intellectual Property Law, PLLC; H. Kenneth Prol

(57) ABSTRACT

An information handling system includes a flexible display screen, first and second display platforms, and a plurality of micro-beads. The flexible display screen is movably mounted to the first and second display platforms. The plurality of micro-beads is coated on the flexible display screen, and the plurality of micro-beads comprises a protective layer of increase hardness relative to the flexible display screen.

20 Claims, 4 Drawing Sheets

PROTECTION LAYER ON A FLEXIBLE SUBSTRATE

This application is a continuation of prior application Ser. No. 14/615,130, entitled "Protection Layer on a Flexible Substrate," filed on Feb. 5, 2015, which is assigned to the current assignee hereof and is incorporated herein by reference in its entirety.

FIELD OF THE DISCLOSURE

The present disclosure generally relates to a protection layer on a flexible substrate.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have two or more display platforms with one or more display screens to output images.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
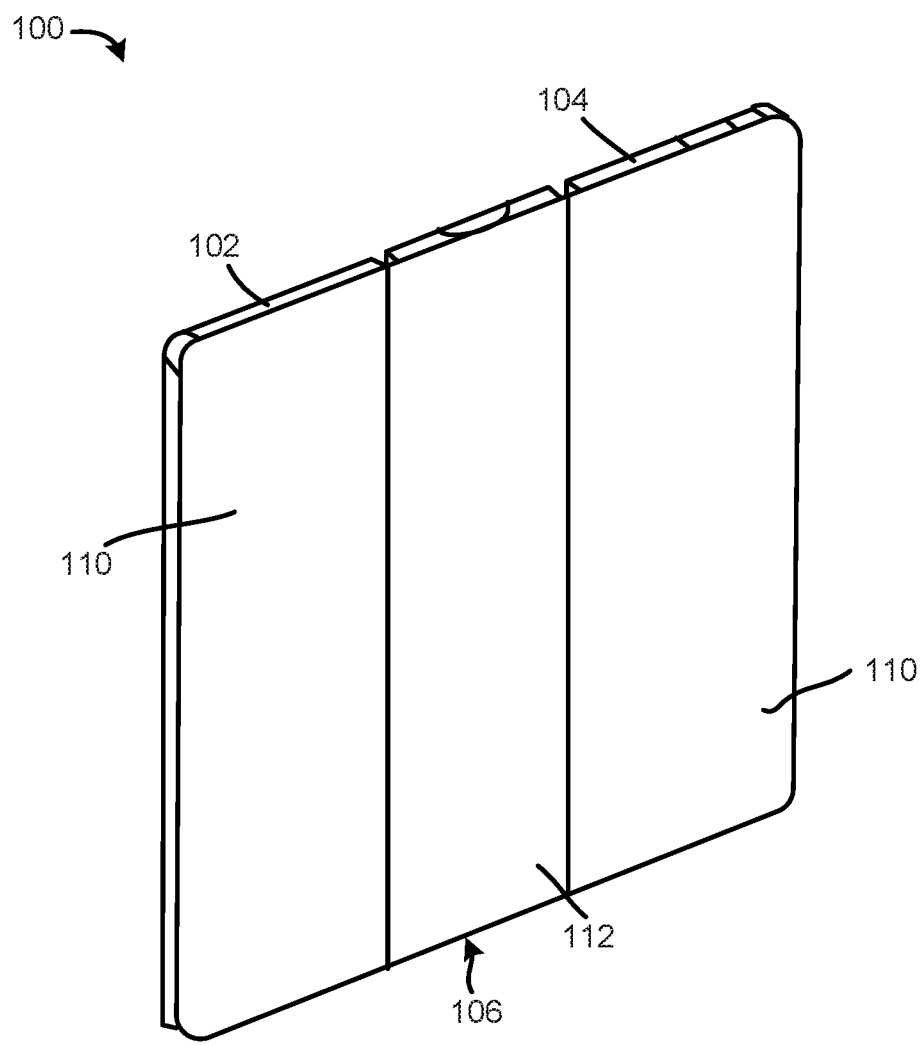
FIG. 1 is a diagram of an information handling system in an open position according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. Thus, there is an increased need for extended display capabilities to facilitate broad range of usage including to enable multitasking by users. Additionally, traditional information handling system input devices such as keyboards and mouse systems are giving way to visual input interfaces such as touchscreens, hover detection, and motion sensing technologies. In many instances, it is substantially beneficial to implement a system with multiple display platforms having one or more display screens configurable in many orientations to interact with an information handling system.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Multiple display platform information handling systems may be configurable in a plurality of orientations for utilization of and interaction with the information handling system. Hereinafter, the terms dual display screen information handling system or dual display information handling systems, or dual display platform information handling system each may refer to devices with a single display screen such as a flexible display that is layered over or mounted on all or part of two or more display platforms, or each may refer to devices with two or more fully integrated display screens, or each may refer to devices with a plurality of separate display screens that are modularly connectable to the information handling system or to one another. The terms screen or display screen may also refer to a portion of a single display screen, such as a flexible display screen, with a plurality of portions or to an individual display screen. Screens or display screens may herein refer to portions of a display screen and may be mounted on or integrated into one or more display platforms. It is understood that while two display platforms are disclosed in several embodiments herein, embodiments including a plurality of display platforms including three or more display platforms in hinged relationship is also contemplated for the systems and methods disclosed herein. One of ordinary skill would understand implementing the systems and method embodiments discussed herein for these additional embodiments.

FIGS. 1-5 show an information handling system including two hinged display platforms, a flexible display screen, and a protection layer. The flexible display screen includes two side regions, and a bend region. In an embodiment, all or portions of the flexible display screen, such as the bend region, can be coated with the protection layer. In an embodiment, spaces between the micro-beads can be substantially small enough to be undetectable by an individual during a tactile touch of the flexible display screen. Thus, the size of the micro-beads and the spaces between the micro-beads can cause the protective layer to have a smooth, glass-like feel when touched with a finger of an individual. In an embodiment, the micro-beads can be located only in the bend region, and a continuous ceramic material can be located within the side regions. In another embodiment, the micro-beads can be coated over the entire flexible display screen, e.g., the side regions and the bend region, and fewer micro-beads can be deposited within the bend region as compared to the side regions. The fewer micro-beads in the bend region can increase the flexibility of the protective layer within the bend region. In an embodiment, the protection layer may be discontinuous, such that the protective layer only includes micro-beads as a coating on the flexible display screen. In another embodiment, the protection layer may be continuous, such that the protective layer includes a plastic substrate coated on the flexible display screen, and micro-beads that are deposited in the plastic substrate.

The micro-beads within the bend region can separate from one another to accommodate a change in length in the protective layer as the flexible display screen bends to form to the display platforms in the closed position. In an embodiment, the separation of the micro-beads within the bend region is substantially small enough to be undetected by an individual. Thus, the micro-beads of the protective layer have an increased hardness as compared to the flexible display screen. Additionally, the plastic substrate of the protective layer can cause the protective layer to maintain the flexibility of the display screen.

FIG. 1 shows an embodiment of a dual display platform information handling system 100 with two hinged display platforms 102 and 104 according to an embodiment of the present disclosure. In this embodiment, the information handling system 100 includes display platforms 102 and 104, and a flexible display screen 106. The flexible display screen 106 includes two side regions 110, and a bend region 112.

In an embodiment, display platforms 102 and 104 may include housings to contain underlying electronics and power components of the information handling system 100. Accordingly for the described embodiment, housings may be used interchangeably with display platforms. In an embodiment, the flexible display screen 106, such as a flexible active-matrix organic LED (AMOLED) display, may be mounted over or into display platforms 102 and 104. In the example embodiment, the display screen 106 may be mounted to and supported by the display platforms 102 and 104. The mounted flexible display screen 106 may be movably mounted to display platforms 102 and 104. In other words, mounted flexible display screen 106 may be able to slide or otherwise move with respect to one or both of the display platforms 102 and 104.

As illustrated in FIG. 1, the information handling system 100 is in a landscape page orientation, or open position, and the display platforms 102 and 104 are substantially inline with each other. In an embodiment, the display screen 106 can include a protective layer, which in turn can include multiple micro-beads as shown in greater detail in FIG. 2.

Figure 2:
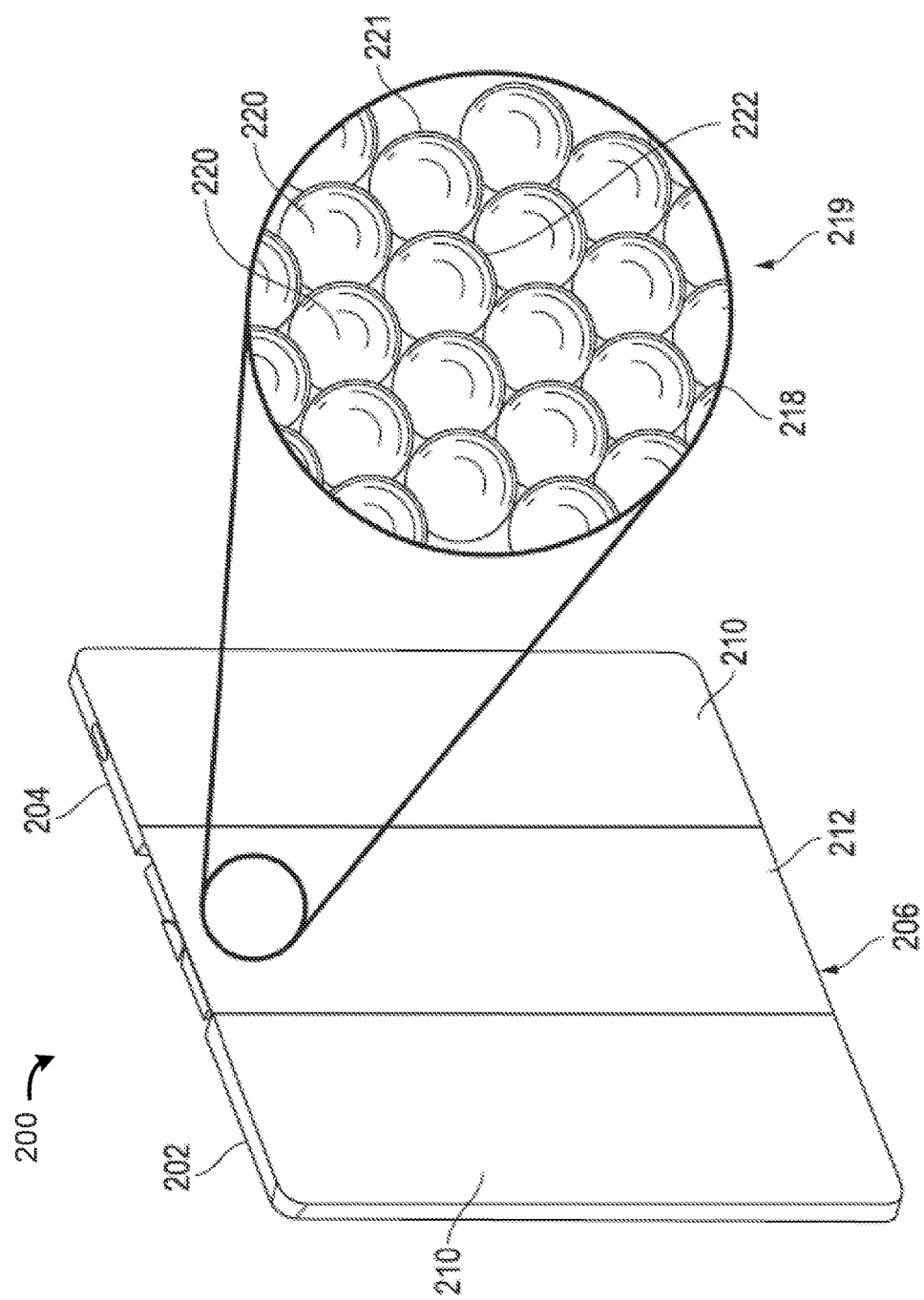
FIG. 2 is another diagram of the information handling system in the open position according to an embodiment of the present disclosure.

FIG. 2 illustrates an information handling system 200 in an open position according to an embodiment of the present disclosure. In this embodiment, the information handling system 200 includes display platforms 202 and 204, and a flexible display screen 206. The flexible display screen 206 includes side regions 210, and a bend region 212. As illustrated in the embodiment of FIG. 2, all or portions of the flexible display screen 206, such as the bend region 212, can be coated with a protection layer 219 (as shown in the enlarged portion 218). In an embodiment, the protection layer 219 includes micro-beads 220. In some embodiments, the protection layer 219 includes the micro-beads 220, and a plastic substrate 221. In an embodiment, micro-beads 220 can be ceramic nano-spheres, such as glass, and the size of the micro-beads can be on the nanometer level. For example, the micro-beads may be less than 15 microns in diameter, may be less than 10 microns in diameter, or the like. In an embodiment, the micro-beads 220 can be discontinuous across the surface of the flexible display screen 206. For example, spaces 222 can be located between the micro-beads 220. However, the spaces 222 between the micro-beads 220 can be substantially small enough to be undetectable by an individual during a tactile touch of the flexible display screen 206. Thus, the size of the micro-beads 220 and the spaces 222 between the micro-beads 220 can cause the protective layer 219 to have a smooth, glass-like feel when touched with a finger of an individual. In an embodiment, the micro-beads 220 can be closely bound to each other while the display platforms 202 and 204 of the information handling system 200 are in the open position.

In an embodiment, the micro-beads 220 can be located only in the bend region 212, and a continuous glass or ceramic material can be located within the side regions 210. In another embodiment, the micro-beads 220 can be coated over the entire flexible display screen 206, e.g., the side regions 210 and the bend region 212, and fewer micro-beads 220 can be deposited within the bend region 212 as compared to the side regions 210. The fewer micro-beads 220 in the bend region 212 can increase the flexibility of the protective layer 219 within the bend region 212. The ceramic composition of the micro-beads 220 can cause the protective layer 219 to have an increased hardness as compared to the flexible display screen 206. For example, the flexible display screen 206 can have a hardness rating of 3H, and the micro-beads 220 of the protective layer 219 can have a hardness rating of 7H. In an embodiment, the plastic substrate 221 and the spaces 222 between the micro-beads 220 can maintain the flexibility of the flexible display screen 206. In an embodiment, the plastic substrate 221 can include polyethylene terephthalate (PET), or a similar material. The protective layer 219 can also increase a resistance of the flexible display screen 206 against corrosion, can prevent light reflection or refraction off of the flexible display screen 206, can increase a slipperiness of the flexible display screen 206, or the like. In an embodiment, the plastic substrate 221 can enable the micro-beads 220 within the bend region 212 to separate from one another as the display platforms 202 and 204 rotate from the open position to a closed position as shown in FIG. 3.

Figure 3:
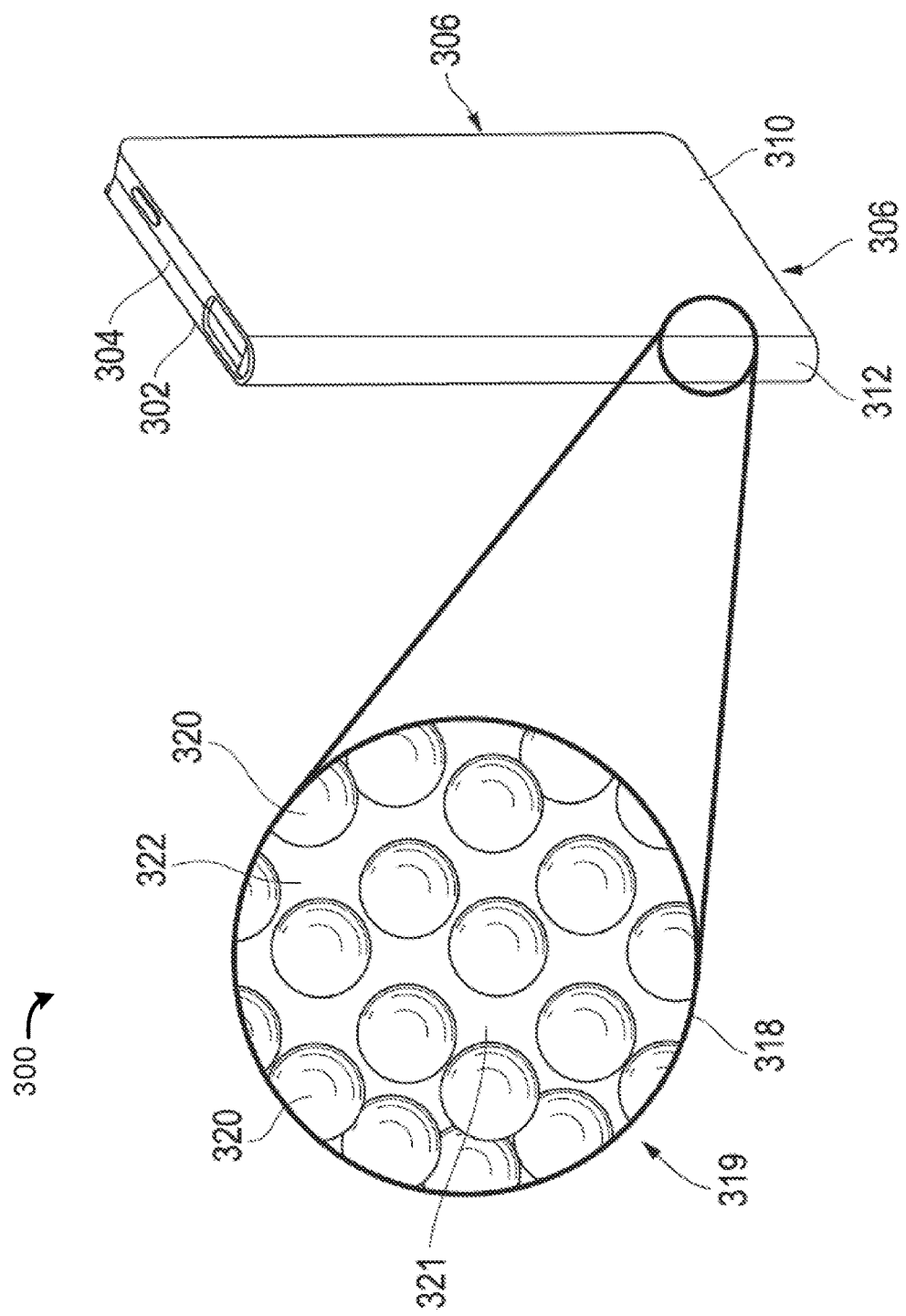
FIG. 3 is a diagram of the information handling system in a closed position according to an embodiment of the present disclosure.

FIG. 3 illustrates an information handling system 300 in a closed position according to an embodiment of the present disclosure. In this embodiment, the information handling system 300 includes display platforms 302 and 304, and a flexible display screen 306. The flexible display screen 306 includes side regions 310, and a bend region 312. As illustrated in the embodiment of FIG. 3, the bend region 312 of the flexible display screen 306 can be coated with a protection layer 319 (as shown in the enlarged portion 318). In an embodiment, the protective layer 319 can be discontinuous and include micro-beads 320. In another embodiment, the protective layer 319 can be continuous and include the micro-beads 320 and a plastic substrate 321. In an embodiment, the micro-beads 320 can be discontinuous across the bend region 312. For example, spaces 322 can be located between the micro-beads 320.

As shown in the enlarged portion 318, the micro-beads 320 within the bend region 312 separate from one another to accommodate a change in length in the protective layer 319 as the flexible display screen 306 bends to form to the display platforms 302 and 304 in the closed position. In an embodiment, the separation of the micro-beads 320 within the bend region 312 is substantially small enough to be undetected by an individual. As described above, the size of the micro-beads is on the nanometer level, such that even as the micro-beads separate from one another the surface of the protective layer 319 remains smooth to the touch. Therefore, the micro-beads 320 of the protective layer 319 can cause the protective layer 319 to have an increased hardness as compared to the flexible display screen 306. The plastic substrate 321 of the protective layer 319 can maintain the flexibility of the display screen 306.

Figure 4:
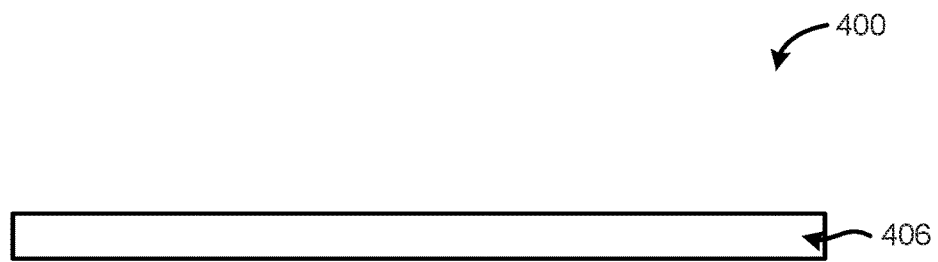
FIG. 4 is a diagram of a cross section of a display screen during a first step in a process for making the display screen with a flexible protection layer according to an embodiment of the present disclosure.

FIG. 4 is a diagram of a cross section of a flexible display screen during a first step 400 in a process for making the flexible display screen with a flexible protection layer according to an embodiment of the present disclosure. As discussed above, the flexible display screen 406 can be a flexible active-matrix organic LED (AMOLED) display.

Figure 5:
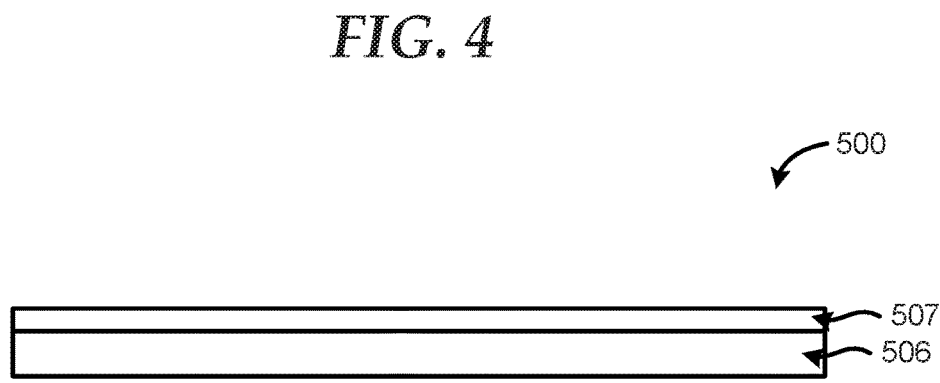
FIG. 5 is a diagram of a cross section of a display screen during a second step in a process for making the display screen with a flexible protection layer according to an embodiment of the present disclosure.

After the flexible display screen 406 is formed, a touch sensitive layer can be deposited as shown in FIG. 5.

FIG. 5 is a diagram of a cross section of a flexible display screen during a second step 500 in the process for making the display screen with a flexible protection layer according to an embodiment of the present disclosure. As illustrated in FIG. 5, the flexible display screen 506 is coated with a touch sensitive layer 507. In this embodiment, the touch sensitive layer 507 can be a capacitive or a compression touch layer. For example, the touch sensitive layer 507 can detect touch inputs in response to a capacitive change that results from an individual placing his or her finger on the touch sensitive layer 507, or can detect touch inputs in response to a compression of the touch sensitive layer 507 caused by an individual pressing his or her finger or a stylus on the touch sensitive layer 507. In an embodiment, both the flexible display screen 506 and the touch sensitive layer 507 are capable of being bent and flexed without breaking as display platforms rotate between the open and closed positions. However, the flexible display screen 506 and the touch sensitive layer 507 can be susceptible to damage based on the softness of the flexible display screen 506 and the touch sensitive layer 507. Thus, the flexible display screen 506 and the touch sensitive layer 507 can be coated with a protective layer as shown in FIG. 6.

Figure 6:
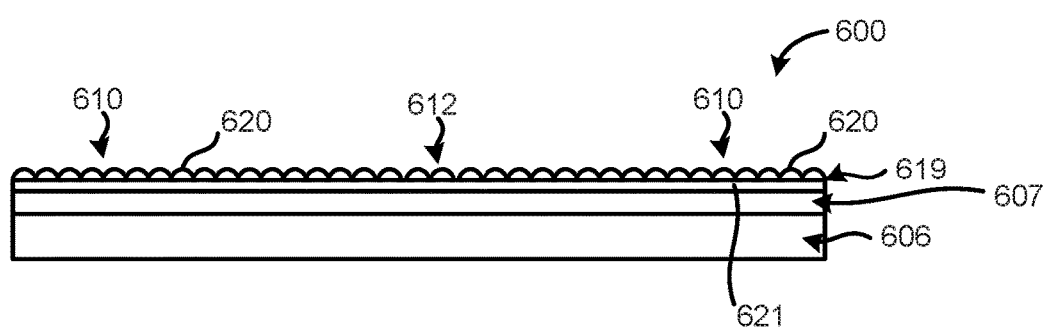
FIG. 6 is a diagram of a cross section of a display screen during a third step in a process for making the display screen with a flexible protection layer according to an embodiment of the present disclosure.

FIG. 6 is a diagram of a cross section of a flexible display screen during a third step 600 in the process for making a display screen with a flexible protection layer according to an embodiment of the present disclosure. As illustrated in FIG. 6, the flexible display screen 606 is coated with a touch sensitive layer 607, which in turn is coated with a protective layer 619. In an embodiment, the coating of touch sensitive layer 607 includes: first depositing a plastic substrate 621; and then depositing multiple micro-beads 620 on the plastic substrate. In another embodiment, the coating of touch sensitive layer 607 includes depositing multiple micro-beads 620 on the touch sensitive layer 607. In an embodiment, the flexible display screen 606 and touch sensitive layer 607 can be incorporated into one component such that the protective layer is deposited on the flexible display screen 606. In an embodiment, the micro-beads 620 can be deposited on the flexible display screen 606 without the plastic substrate first being deposited.

In an embodiment, the micro-beads 620 can be a ceramic material, such as glass, and the micro-beads can be deposited in the plastic substrate 621 to strengthen the protective layer 619. In this embodiment, the combination of the micro-beads 620 being deposited on the flexible display screen 606 and the touch sensitive layer 607 can cause the protective layer to have an increased hardness as compared to the flexible display screen 606 and the touch sensitive layer 607. The plastic substrate 621 can enable the protective layer 619 to bend with the flexible display screen 606 and the touch sensitive layer 607 during the rotation of the display platforms.

In an embodiment, the micro-beads 620 can be deposited on the plastic substrate 619 in different concentrations depending on the region of the flexible display screen 606. For example, the micro-beads 620 can be heavily concentrated on the side regions 610 of the flexible display screen 606 and less concentrated in the bend region 612 of the flexible display screen 606. In this embodiment, the lesser concentration of the micro-beads 620 within the bend region 612 can increase the flexibility of the protective layer 619 in this region as compared to the side regions 610. In an embodiment, the micro-beads 620 can be nano-spheres that can be sized on the nanometer level, and the micro-beads 620 can be deposited substantially close to one another to provide a smooth, glass-like, feel to the protective layer 619 when an individual touches the protective layer. In an embodiment, the micro-beads 620 can be deposited only in the bend region 612, and a continuous glass or ceramic material can be deposited on the side regions 610. The micro-beads 620 in the protective layer 619 can protect the flexible display screen 606, and provide a smooth feel. The plastic substrate 621 in the protective layer 619 can enable the protective layer 619 to bend without breaking.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a flexible display screen;
the flexible display screen movably mounted to a display platform wherein the flexible display screen may bend at a bend region; and
a plurality of micro-beads coated across the bend region on the flexible display screen, wherein the plurality of micro-beads comprises a protective layer of increased hardness relative to the flexible display screen.

2. The information handling system of claim 1, wherein a concentration of the plurality of micro-beads varies depending on the bend region of the flexible display screen.

3. The information handling system of claim 2, wherein the plurality of micro-beads have a lower concentration within the bend region of the flexible display screen as compared to a side region of the flexible display screen.

4. The information handling system of claim 1, wherein protective layer is discontinuous.

5. The information handling system of claim 1, further comprising:
the protective layer includes a plastic substrate operatively coupled between the flexible display screen and the micro-beads, wherein the plastic substrate provides flexibility to the protective layer.

6. The information handling system of claim 1, wherein a distance between the micro-beads increases in response to bending in the bend region.

7. The information handling system of claim 1, wherein a small size of the micro-beads and a small separation between the micro-beads enable the protective layer to feel substantially smooth.

8. The information handling system of claim 1, wherein a continuous glass of the protective layer is deposited on a side region, and the plurality of micro-beads are deposited on the bend region.

9. An information handling system comprising:
a flexible display screen;
a display platform, the flexible display screen movably mounted to the display platform;
a protective layer coated across the flexible display screen, the protective layer including:
a plurality of micro-beads, wherein the plurality of micro-beads of the protective layer have an increased a hardness relative to the flexible display screen; and
a plastic substrate operatively coupled between the plurality of micro-beads and the flexible display screen, wherein the plastic substrate maintains the flexibility of the flexible display screen.

10. The information handling system of claim 9, wherein a concentration of the plurality of micro-beads varies depending on a bend region of the flexible display screen.

11. The information handling system of claim 10, wherein the plurality of micro-beads have a lower concentration within the bend region of the flexible display screen as compared to a side region of the flexible display screen.

12. The information handling system of claim 9, wherein a distance between the micro-beads increases in response to bending of the display screen.

13. The information handling system of claim 9, wherein a small size of the micro-beads and a small separation between the micro-beads enable the protective layer to feel substantially smooth.

14. The information handling system of claim 9, wherein a diameter of the micro-beads are less than fifteen microns.

15. A method of forming a flexible display screen having a protective layer within an information handling system, the method comprising:
providing a flexible display screen wherein the flexible display screen may bend at a bend region; and
depositing a plurality of micro-beads on the flexible display screen, as a coating across the bend region, wherein the plurality of micro-beads have an increased hardness relative to the flexible display screen.

16. The method of claim 15, further comprising:
depositing a continuous glass on a side region of the flexible display screen, wherein the plurality of micro-beads are deposited on the bend region of the flexible display screen.

17. The method of claim 15, wherein depositing the plurality of micro-beads comprises:
depositing a first portion of the plurality of micro-beads at a first concentration level on a first bend region of the flexible display screen; and
depositing a second portion of the plurality of micro-beads at a second concentration level on a second bend region of the flexible display screen.

18. The method of claim 17, wherein the first concentration level is higher than the second concentration level.

19. The method of claim 15, further comprising:
depositing a plastic substrate on the flexible display screen prior to depositing the plurality of micro-beads.

20. The method of claim 15, wherein a small size of the micro-beads and a small separation between the micro-beads enable a surface of the micro-beads to feel substantially smooth.

* * * * *